United States Patent [19]

Aoki et al.

[11] Patent Number: 5,424,857
[45] Date of Patent: Jun. 13, 1995

[54] MATRIX-TYPE DISPLAY APPARATUS WITH CONDUCTOR WIRE INTERCONNECTING CAPACITOR ELECTRODES

[75] Inventors: Hironori Aoki; Naoki Nakagawa; Tatsuya Nakayama, all of Kumamoto, Japan

[73] Assignees: Asahi Glass Company Ltd.; Mitsubishi Denki Kabushiki Kaisha, both of Toyko, Japan

[21] Appl. No.: 263,084

[22] Filed: Jun. 21, 1994

[30] Foreign Application Priority Data

Jun. 22, 1993 [JP] Japan ................................ 5-150411

[51] Int. Cl.$^6$ ............................................. G02F 1/343
[52] U.S. Cl. ........................................ 359/59; 359/54; 359/87
[58] Field of Search ............... 359/59, 54, 87; 257/59, 257/72, 296

[56] References Cited

U.S. PATENT DOCUMENTS

| | | | |
|---|---|---|---|
| 5,042,916 | 8/1991 | Ukai et al. ................. | 359/59 |
| 5,162,901 | 11/1992 | Shimada et al. ............ | 359/54 |
| 5,212,574 | 5/1993 | Katayama et al. .......... | 359/87 |

FOREIGN PATENT DOCUMENTS

| | | | |
|---|---|---|---|
| 61-29820 | 2/1986 | Japan . | |
| 1-191830 | 8/1989 | Japan . | |
| 1265232 | 10/1989 | Japan ................. | 359/59 |
| 3145627 | 6/1991 | Japan ................. | 359/59 |
| 4-140725 | 5/1992 | Japan . | |

*Primary Examiner*—Anita Pellman Gross
*Assistant Examiner*—James A. Dudek
*Attorney, Agent, or Firm*—Burns, Doane, Swecker & Mathis

[57] ABSTRACT

A matrix-type display having a TFT substrate provided with at least a pixel electrode and a thin film transistor; and an opposing electrode; wherein a material for changing an optical property is interposed between the TFT substrate and the opposing electrode; a plurality of thin film transistors arrange in a matrix array on a transparent insulative substrate, each of the thin film transistors being provided to each pixel; a gate signal line interconnecting respective gate electrodes of the thin film transistors arrange in a row or column of the matrix array; a source electrode line interconnecting respective source or drain electrodes of thin film transistor arranged in a column or row of the matrix array; a pixel electrode formed of a transparent conductor film and connected to the source or drain electrode of each of the thin film transistors; a capacitor electrode capacitively coupled to the pixel electrode through a dielectric film; a conductor wire interconnecting the respective capacitive electrode of the pixels interconnected by the gate signal line, wherein the conductor wire is formed integrally with the capacitor electrode, wherein the gate signal line is formed above the conductor wire with the dielectric film intervening therebetween, and wherein the conductor wire interconnecting the respective capacitor electrode of the pixels arranged along the gate signal line.

3 Claims, 6 Drawing Sheets

MATRIX-TYPE DISPLAY APPARATUS WITH CONDUCTOR WIRE INTERCONNECTING CAPACITOR ELECTRODES

BACKGROUND OF THE INVENTION

The present invention relates to matrix-type display apparatus and, more particularly, to an improved matrix-type display apparatus in which degradation of display characteristics thereof is mitigated which is attributable to delay of gate signals due to an increase in the resistance of a gate signal line.

Typically, a matrix-type display apparatus comprises two transparent insulative substrates opposed to each other, each having an electrode film and an orientation film on a surface thereof, and a displaying material, such as a liquid crystal, interposed between the pair of substrates in the gap defined therebetween. This displaying material is applied with a voltage on a pixel basis to display an image. The electrode film on at least one of the substrates is composed of transparent electrically-conductive films arranged in a matrix-like manner to form pixel electrodes. There are further provided switching elements, such as thin film transistors (TFTs), for selectively applying a voltage to these pixel electrodes and capacitors for storing electric charge. The TFT array substrate of a conventional matrix-type display apparatus is shown in FIGS. 5 and 6. FIG. 5 is a plan view of one pixel portion of such TFT array substrate, and FIG. 6 is a sectional view taken along line VI—VI of FIG. 5.

In FIGS. 5 and 6, the TFT array substrate includes a source electrode line 1, a gate electrode 2, a gate signal line 3, a gate insulating film 4, a non-doped amorphous silicon layer 5, an etching stopper 6, a phosphorus-doped amorphous silicon layer 7, a drain electrode 8, a pixel electrode 9 formed of a transparent conductive film and connected to the drain electrode 8, a protective film 1 0, a capacitive insulating film 11, a capacitive electrode 12, and a transparent insulative substrate 30.

Such a TFT array substrate is fabricated by the following process. Initially, the capacitive electrode 12 such as made of chromium is formed on the transparent insulative substrate 30 in an island-like manner. The capacitive insulating film 11 is then formed, followed by forming a contact hole 11a through the capacitive insulating film 11 by etching or a like process for providing electrical contact of the capaciting electrode 12 to the gate electrode 2 and to the gate signal line 3 to be formed later. Subsequently, the gate electrode 2 and the gate signal line 3 are formed, followed by the formation of the pixel electrode 9. Thereafter, the gate insulating film 4 and functional layers, i.e., the non-doped amorphous silicon layer 5 and phosphorus-doped amorphous silicon layer 7 are formed, followed by patterning. Finally, the source electrode line 1 and the drain electrode 8 are formed. Thus, a TFT is constructed. This TFT and the pixel electrode 9 form a part of the TFT array. In this TFT array substrate, the pixel electrode 9 overlaps the capacitor dielectric film 11 so that the capacitive insulating film 11 is interposed between the capacitive electrode 12 connected to the gate signal line 3 of the adjacent TFT section and the pixel electrode 9, thereby forming a capacitor.

The TFT array substrate thus constructed and a counterpart electrode substrate having a color filter, transparent conductive film and the like are disposed in opposing relation as interposing a display material such as a liquid crystal therebetween, thus constructing the matrix-type display apparatus.

In the conventional matrix-type display apparatus, a voltage is applied to the gate electrode provided to each pixel through the gate signal line to turn the pixel ON. However, since this gate signal line is connected to the capacitor to improve the capacitive characteristics of the apparatus, the capacitance of the gate signal line is increased, so that a gate signal applied to a pixel near the terminal end of the gate signal line is delayed with respect to a gate signal applied to a pixel near the input terminal of the gate signal line. Due to this delay of gate signal, the voltage applied to each pixel electrode does not reach a predetermined value thereby degrading the display quality of the apparatus.

Further, in the conventional matrix-type display apparatus only the gate insulating film is provided as an insulator in a portion where the gate signal line and the source signal line intersect each other. Hence, when a failure occurs in the gate insulating film lying in such intersecting portion, a current leakage occurs between the gate signal line and the source signal line to cause a defective display. This results in a difficulty in improving the yield of production of display apparatus.

The present invention has been attained to overcome the foregoing problems. It is, therefore, an object of the present invention to provide a matrix-type display apparatus in which the occurrence of a gate signal delay is suppressed and the shortcircuiting between the gate signal line and the source signal line is prevented.

SUMMARY OF THE INVENTION

According to one aspect of the present invention, there is provided a matrix-type display apparatus comprising:

a TFT substrate provided with at least a pixed electrode and a thin film transistor; and an opposing electrode;

wherein a material for changing an optical property is interposed between said TFT substrate and said opposing electrode said apparatus further comprising a plurality of thin film transistors arranged in a matrix array on a transparent insulative substrate, each of the thin film transistors being provided to each pixel;

a gate signal line interconnecting respective gate electrodes of thin film transistors arranged in a row or column of the matrix array;

a source electrode line interconnecting respective source or drain electrodes of thin film transistors arranged in a column or row of the matrix array;

a pixel electrode formed of a transparent conductor film and connected to the source or drain electrode of each of the thin film transistors;

a capacitor electrode capacitively coupled to the pixel electrode through a dielectric film;

a conductor wire interconnecting the respective capacitive electrodes of the pixels interconnected by the gate signal line, wherein said conductor wire is formed integrally with said capacitor electrode, wherein said gate signal line is formed above said conductor wire with said dielectric film intervening therebetween, and wherein said conductor wire interconnects the respective capacitor electrodes of the pixels arranged along the gate signal line.

According to another aspect of the present invention, there is provided a matrix-type display apparatus comprising:

a TFT substrate provided with at least a pixed electrode and a thin film transistor; and an opposing electrode;

wherein a material for changing an optical property is interposed between said TFT substrate and said opposing electrode said apparatus further comprising a plurality of thin film transistors arranged in a matrix array on a transparent insulative substrate, each of the thin film transistors being provided to each pixel, a gate signal line electrically connected to respective gate electrodes of thin film transistors arranged in a row or column of the matrix array, a source electrode line interconnecting respective source or drain electrodes of thin film transistors arranged in a column or row of the matrix array, a pixel electrode formed of a transparent conductor film and connected to the source or drain electrode of each of the thin film transistors, a capacitor electrode capacitively coupled to the pixel electrode through a dielectric film, a conductor wire interconnecting the respective capacitor electrodes of the pixels arranged along the gate signal line, said gate signal line being discretely separated on a pixel basis so as not to intersect said source electrode line, said conductor wire being electrically connected to each separated segment of said gate signal line.

Preferably, the conductor wire is formed integrally with the capacitor electrode, the gate signal line discretely separated on a pixel basis is formed above the conductor wire with the dielectric film intervening therebetween, and the conductor wire and each separated segment of the gate signal line provided to each pixel are electrically connected to each other through a contact hole formed through the dielectric film.

The matrix-type display apparatus according to one aspect of the present invention is provided with the conductor wire interconnecting the capacitor electrodes and provides an electrical contact between the conductor wire and the gate signal line, hence, the gate electrode. Such an arrangement permits the capacitance and resistance of the gate signal line to be reduced and, hence, a delay of gate signal is unlikely to occur even at a location near the terminating end of the gate signal line. Therefore, the display apparatus assures application of a required voltage to all the pixels thereof and allows a high-quality display to be maintained.

The matrix-type display apparatus according to another aspect of the present invention has the gate signal line which is discretely separated so as not to intersect the source electrode line. Accordingly, a short circuit cannot occur between the gate signal line and the source electrode line. Further, the gate signal line is electrically connected to the conductor wire connected to the capacitor electrode, so that a signal is fed through both the gate signal line and the conductor wire. Such an arrangement permits the gate signal line to have a reduced capacitance and resistance, hence prevents a signal delay. In addition, the source electrode line does not intersect the gate signal line but the conductor wire and, further, the capacitor dielectric film as well as the gate insulating film intervenes between the conductor wire and the source electrode line. This assures a sufficient insulation between the gate signal line and the source electrode line and prevents shortcircuiting in a portion where the conductor wire and the source electrode line intersect.

DETAILED DESCRIPTION

The present invention will now be described in detail with reference to the drawings.

EXAMPLE 1

Figure 1:
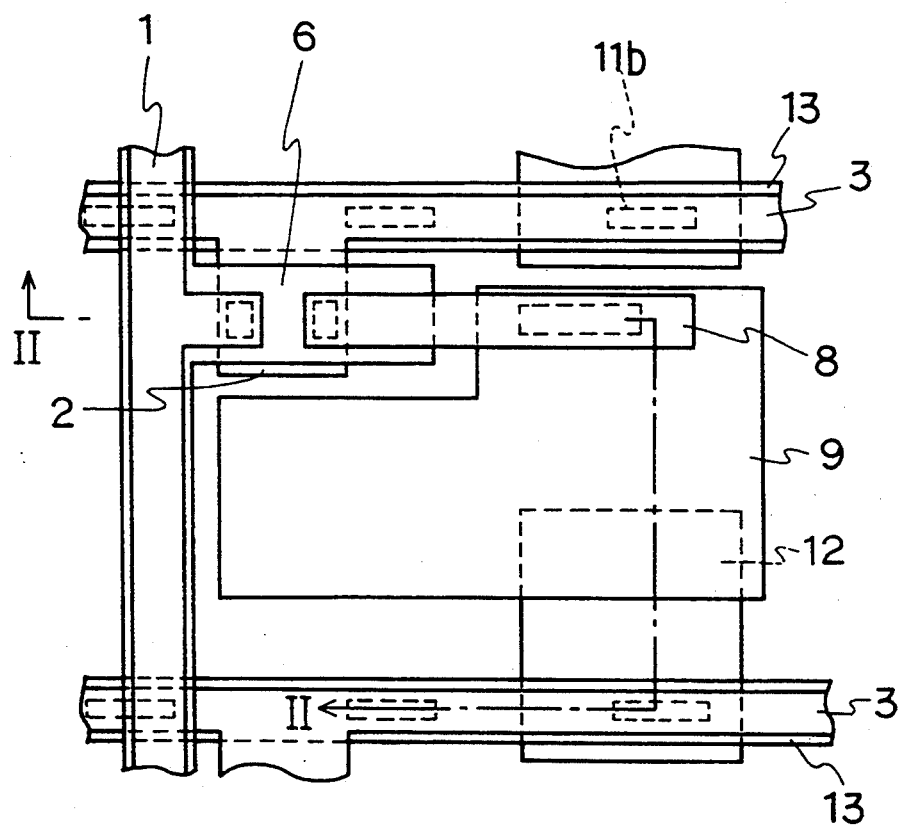
FIG. 1 is a plan view showing one pixel portion of a TFT array substrate according to Embodiment 1 of a matrix-type display apparatus according to the present invention.
Figure 2:
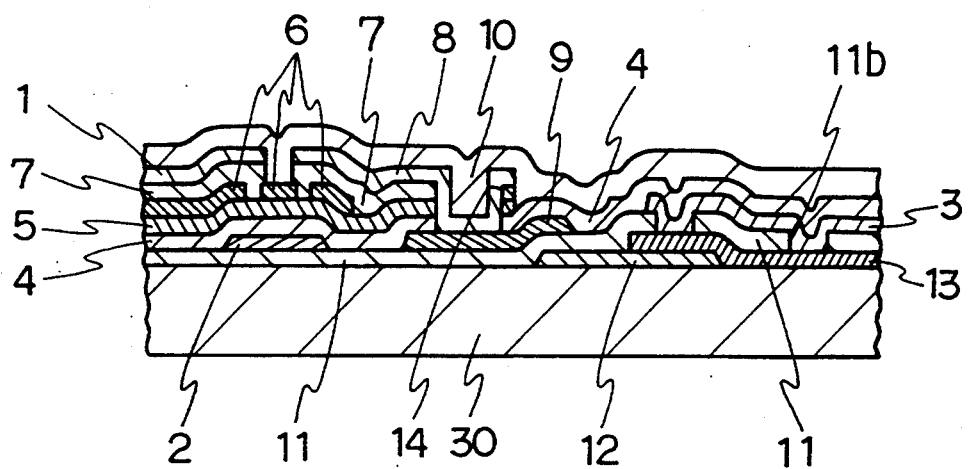
FIG. 2 is a sectional view of the matrix-type apparatus, taken along a line II—II of FIG. 1.

FIGS. 1 and 2 illustrate Example 1 of a matrix-type display apparatus according to the present invention. Example 1 includes a source electrode line 1, a gate electrode 2, a gate signal line 3, a gate insulating film 4, a non-doped amorphous silicon layer 5, an etching stopper 6, a phosphorus-doped amorphous silicon layer 7, a drain electrode 8, a pixel electrode 9 connected to the drain electrode 8, a protective film 10, a capacitive insulating film 11, a capacitive electrode 12, and a transparent insulative substrate 30.

The TFT substrate shown in FIG. 1 is characterized by the provision of a conductor wire 13 electrically interconnecting capacitive electrodes 12 which extends along the gate signal line 3 and underlies the capacitive insulating film 11. The conductor wire 13 and the gate signal line 3 are electrically connected to each other through a plurality of contact holes 11b provided as extending through the capacitor dielectric film 11. This arrangement allows a gate signal to be fed through both the gate signal line 3 and the conductor wire 13 thereby reducing the resistance of wiring. Hence, a gate signal delay is reduced.

Such a TFT array substrate is fabricated by the following process. Initially, capacitive electrodes 12 such as made of chromium are formed on the transparent insulative substrate 30, and then the conductor wire 13 is formed to interconnect these capacitive electrodes 12.

Although the capacitive electrodes 12 and the conductor wire 13 interconnecting these electrodes are formed by separate steps in example 1, integral formation of these components by the same step would make it possible to facilitate the formation thereof without increasing the number of fabrication steps.

In turn, the capacitive insulating film 11 such as made of $Ta_2O_5$ is formed by CVD, sputtering or a like process, followed by forming contact holes 11b through this film for providing electrical connection between the capacitive electrodes 12 and the gate signal line 3 to be formed later. Further, the gate electrode 2 and gate signal line 3 such as made of chromium or aluminum are formed as electrically connecting to the capacitive electrodes 12 through the contact holes 11b extending through the capacitive insulating film 11. In turn, the pixel electrode 9 of a transparent electrode material such as ITO is formed as partially superposed on each capacitive electrode 12 with the capacitive insulating film interposed therebetween, thus forming a capacitor.

The contact holes 11b may be appropriately formed along the gate signal line 3. If, however, each contact hole 11b is formed in a portion adjacent each end of the gate signal line 3, a signal can be fed to a TFT located in an end portion of the substrate without delay.

In turn, there are sequentially formed by plasma CVD or a like process the gate insulating film 4 of $Si_3N_4$, non-doped amorphous silicon (i-a-Si) layer 5 and etching stopper 6 such as made of $Si_3N_4$, followed by patterning the etching stopper 6. In this patterning, a contact hole is formed through the etching stopper 6 for providing electrical contact between the underlying non-doped amorphous silicon layer 5 and the doped amorphous silicon layer 7 to be formed later.

Subsequently, the phosphorus-doped amorphous silicon layer 7 is formed, then patterned to form a contact hole 14 for connecting the pixel electrode 9 to the drain electrode 8.

Further, a chromium or aluminum film is formed by sputtering or a like process, then patterned to form the source electrode line 1 and the drain electrode line 8. Using the thus formed source electrode line 1 and drain electrode line 8 as a mask, unnecessary portions of the amorphous silicon layers 5 and 7 are removed. Finally, the overall resulting surface of the substrate is covered with the protective film 10 such as made of $Si_3N_4$. Thus, the TFT array substrate is completed. This substrate is disposed in opposing relation with a counterpart electrode substrate having a color filter, a transparent electrode film and the like, as interposing therebetween a display material such as a liquid crystal material. In this way, the matrix-type display apparatus is constructed.

EXAMPLE 2

Figure 3:
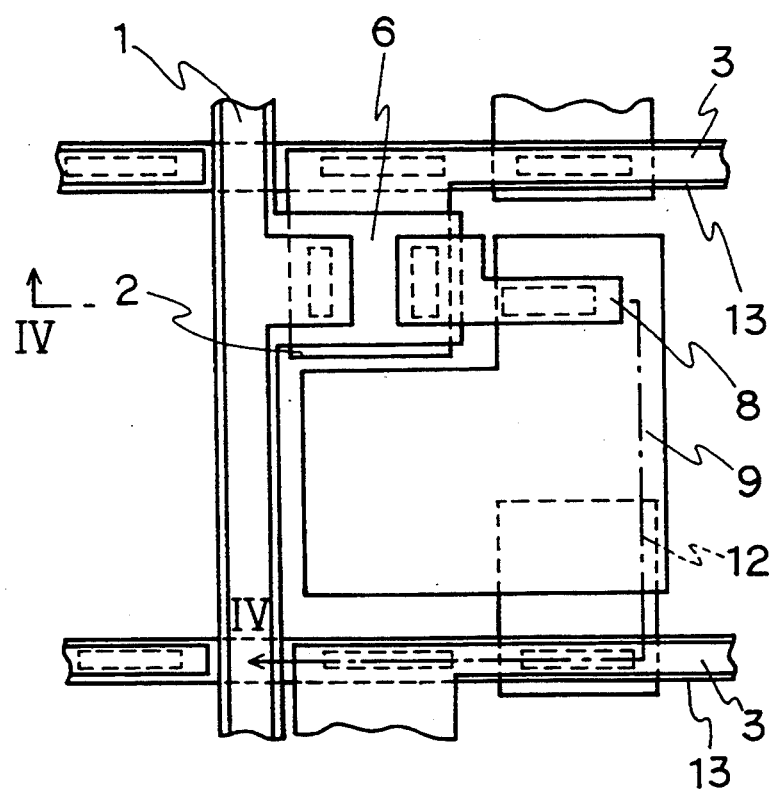
FIG. 3 is a plan view showing one pixel portion of a TFT array substrate according to Embodiment 2 of a matrix-type display apparatus according to the present invention.
Figure 4:
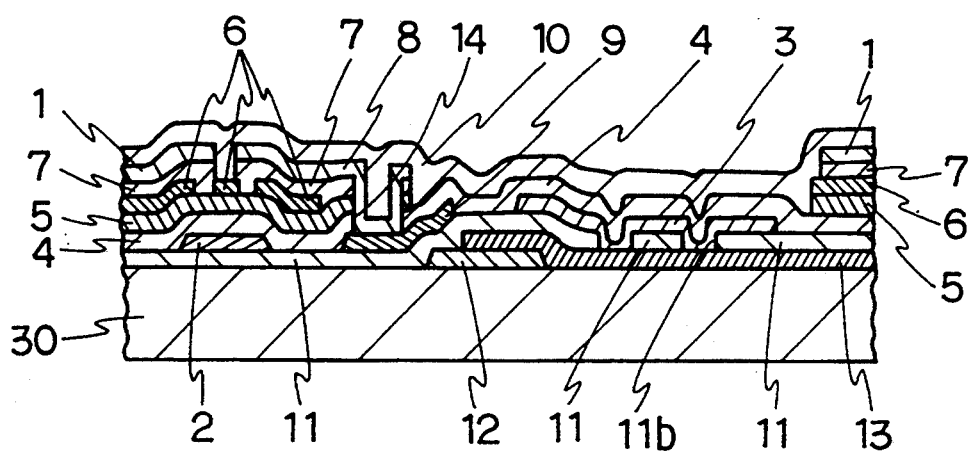
FIG. 4 is a sectional view of the matrix-type apparatus, taken along a line IV—IV of FIG. 3.
Figure 5:
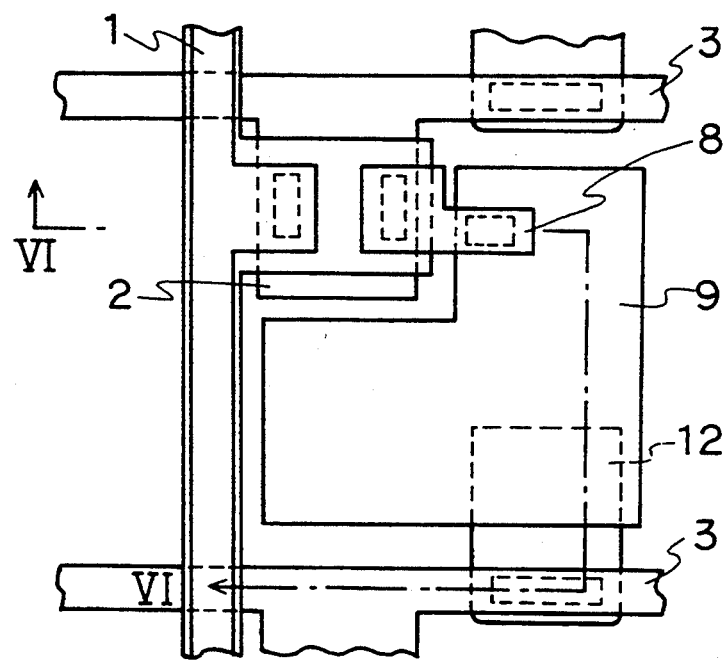
FIG. 5 is a plan view showing one pixel portion of a TFT array substrate of a conventional matrix-type display.
Figure 6:
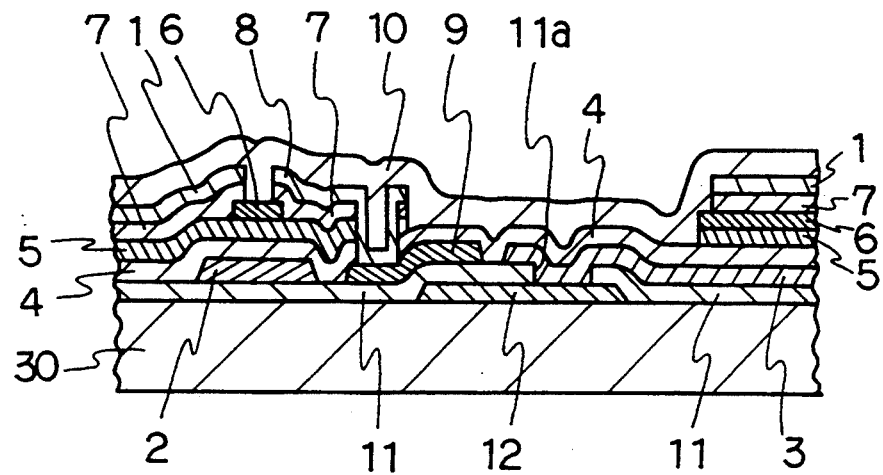
FIG. 6 is a sectional view of the conventional matrix-type apparatus, taken along a line VI—VI of FIG. 5.

FIGS. 3 and 4 illustrate Example 2 of a matrix-type display apparatus according to the present invention. In FIGS. 3 and 4, same numerals are used to denote like parts of Example 1. The TFT array substrate of Example 2 is of the same arrangement as that of Example 1 except for the gate signal line 3. Example 2 is characterized in that the gate signal line 3 is cut off in the vicinity of the source electrode line 1 so as not to intersect the source electrode line 1.

The gate insulating film 4 and the capacitive insulating film 11 intervene between the source electrode line 1 and the conductor wire 13 in their intersecting portion and, hence, improved insulating property can be ensured between the source electrode line 1 and the conductor wire 13. As a result, the source electrode line 1 and the gate signal line 3 can be prevented from short-circuiting to each other in such an intersecting portion.

On the other hand, adjacent separated segments of the gate signal line 3 which are opposed to each other such that the source electrode line 1 is interposed between the gate signal lines are electrically connected to each other through the conductor wire 18. Therefore, as in Example 1, a gate signal can be transmitted to each pixel with the gate signal delay reduced.

Such a TFT array substrate is fabricated by the following process. Initially, capacitive electrodes 12 such as made of chromium are formed on the transparent insulative substrate 30, and then the conductor wire 13 is formed to interconnect these capacitive electrodes 12.

Although the capacitive electrodes 12 and the conductor wire 13 interconnecting these electrodes are formed by separate steps in Example 2, integral formation of these components by the same step would make it possible to facilitate the formation thereof without increasing the number of fabrication steps.

In turn, the capacitive insulating film 11 such as made of $Ta_2O_5$ is formed, followed by forming contact holes 11b through this film at portions thereof overlying the conductor wire 13 for providing electrical connection between the conductor wire 13 and the gate signal line 3 to be formed later. Further, the gate electrode 2 and gate signal line 3 are formed by patterning process based on photolithography. In this case, the gate signal line 3 is formed so as not to intersect the source electrode line 1 to be formed later while electrically connecting to the conductor wire 13 through the contact holes 11b. In turn, the pixel electrode 9 of a transparent electrode material such as ITO is formed as partially superposed on each capacitive electrode 12 with the capacitive insulating film 11 sandwiched therebetween.

The contact holes 11b may be appropriately formed along the gate signal line 3. If, however, the contact holes 11b are each formed on a pixel basis in a portion adjacent each end of each segment of the gate signal line 3 or in a portion adjacent only one end of each segment of the gate signal line 3, a signal can be fed to a TFT located in an end portion of the substrate without delay.

In turn, there are sequentially formed by plasma CVD or a like process the gate insulating film 4 of $Si_3N_4$, non-doped amorphous silicon (i-a-Si) layer 5 and etching stopper 6 such as made of $Si_3N_4$, followed by patterning the etching stopper 6.

Subsequently, the phosphorus-doped amorphous silicon layer 7 is formed, followed by the formation of the pixel electrode 9, drain electrode 8 and contact hole 14 by patterning process.

Further, a chromium or aluminum film is formed by sputtering or a like process, then patterned to form the source electrode line 1 and the drain electrode line 8. Using the thus formed source electrode line 1 and drain electrode line 8 as a mask, unnecessary portions of the amorphous silicon layers 5 and 7 are removed. Finally, the overall resulting surface of the substrate is covered with the protective film 10 such as made of $Si_3N_4$. Thus, the TFT array substrate is completed. This substrate is disposed in opposing relation with a counterpart electrode substrate having a color filter, a transparent electrode film and the like, as sandwiching therebetween a display material such as a liquid crystal material. In this way the matrix-type display apparatus is constructed.

As has been described, the display apparatus according to the present invention is provided with the conductor wire interconnecting respective capacitor electrodes of pixels and electrically connecting to both the gate signal line and the gate electrode. This allows the resistance of wiring for transmitting a gate signal to decrease and hence gate signal delay to substantially decrease. As a result, the display quality of the display apparatus can be maintained to be high.

Further, by forming the gate signal line in a discretely separated manner so as not to intersect the source electrode line but to electrically connect to the conductor wire, the gate signal line does not directly intersect the source electrode line but through the conductor wire which is spaced apart and insulated from the source electrode line by the stacked structure comprising the gate insulating film and the capacitive insulating film. Thus, shortcircuiting between the source electrode line and the gate signal line can be prevented. Furthermore, a signal is transmitted through both the gate signal line and the conductor wire and, hence, signal delay can be substantially decreased. This assures a display apparatus of high display quality.

While only certain presently preferred embodiments have been described in detail, as will be apparent with those familiar with the art, certain changes and modifications can be made without departing from the spirit and scope of the invention as defined by the following claims.

What is claimed is:

1. A matrix-type display apparatus comprising:
    a TFT substrate provided with at least a pixel electrode and a thin film transistor; and
    an opposing electrode;
    wherein a material for changing an optical property is interposed between said TFT substrate and said opposing electrode said apparatus further comprising
    a plurality of thin film transistors arranged in a matrix array on a transparent insulative substrate, each of the thin film transistors being provided to each pixel;
    a gate signal line interconnecting respective gate electrodes of thin film transistors arranged in a row or column of the matrix array;
    a source electrode line interconnecting respective source or drain electrodes of thin film transistors arranged in a column or row of the matrix array;
    a pixel electrode formed of a transparent conductor film and connected to the source or drain electrode of each of the thin film transistors;
    a capacitor electrode capacitively coupled to the pixel electrode through a dielectric film;
    a conductor wire interconnecting the respective capacitive electrodes of the pixels interconnected by the gate signal line,
    wherein said conductor wire is formed integrally with said capacitor electrode, wherein said gate signal line is formed above said conductor wire with said dielectric film intervening therebetween, and wherein said conductor wire interconnects the respective capacitor electrodes of the pixels arranged along the gate signal line.

2. The display apparatus of claim 1, wherein said conductor wire is formed integrally with said capacitor electrode, wherein said gate signal line discretely separated on a pixel basis is formed above said conductor wire with said dielectric film intervening therebetween, and wherein said conductor wire and each separated segment of said gate signal line provided to each pixel are electrically connected to each other through a contact hole formed through said dielectric film.

3. A matrix-type display apparatus comprising:
    a TFT substrate provided with at least a pixel electrode and a thin film transistor; and
    an opposing electrode;
    wherein a material for changing an optical property is interposed between said TFT substrate and said opposing electrode said apparatus further comprising
    a plurality of thin film transistors arranged in a matrix array on a transparent insulative substrate, each of the thin film transistors being provided to each pixel,
    a gate signal line electrically connected to respective gate electrodes of thin film transistors arranged in a row or column of the matrix array,
    a source electrode line interconnecting respective source or drain electrodes of thin film transistors arranged in a column or row of the matrix array,
    a pixel electrode formed of a transparent conductor film and connected to the source or drain electrode of each of the thin film transistors,
    a capacitor electrode capacitively coupled to the pixel electrode through a dielectric film,
    a conductor wire interconnecting the respective capacitor electrodes of the pixels arranged along the gate signal line,
    said gate signal line being discretely separated on a pixel basis so as not to intersect said source electrode line, said conductor wire being electrically connected to each separated segment of said gate signal line.

* * * * *